(No Model.)

F. M. GLADISH.
DROP SCALE FOR MEASURING GRAIN.

No. 468,173. Patented Feb. 2, 1892.

Witnesses:
E. P. Ellis,
J. M. Nesbit.

Inventor
F. M. Gladish,
per Lehmann & Pattison,
Atty.

UNITED STATES PATENT OFFICE.

FRANCIS M. GLADISH, OF HIGGINSVILLE, MISSOURI.

DROP-SCALE FOR MEASURING GRAIN.

SPECIFICATION forming part of Letters Patent No. 468,173, dated February 2, 1892.

Application filed March 16, 1891. Serial No. 385,177. (No model.)

*To all whom it may concern:*

Be it known that I, FRANCIS M. GLADISH, of Higginsville, in the county of Lafayette and State of Missouri, have invented certain new and useful Improvements in Drop-Scales for Measuring Grain; and I do hereby declare the following to be a full, clear, and exact description of the invention, such as will enable others skilled in the art to which it pertains to make and use it, reference being had to the accompanying drawings, which form part of this specification.

My invention relates to an improvement in automatic drop-scales for measuring grain and other substances; and it consists in the combination of two scale-beams, a pivoted frame connected to each beam, links connected to the frames, a walking-beam for connecting the links of the two beams, connecting-rods, beams from which the article being weighed is suspended, and a spout that is operated by the walking-beam for shifting the flow from one receptacle to another, as will be more fully described hereinafter.

The object of my invention is to provide an automatic scale for measuring grain or other substances as it flows into the receptacles into which it is to be packed, and which scale automatically shifts the flow of the article from one receptacle to the other whenever a predetermined weight is reached.

Figure 1:
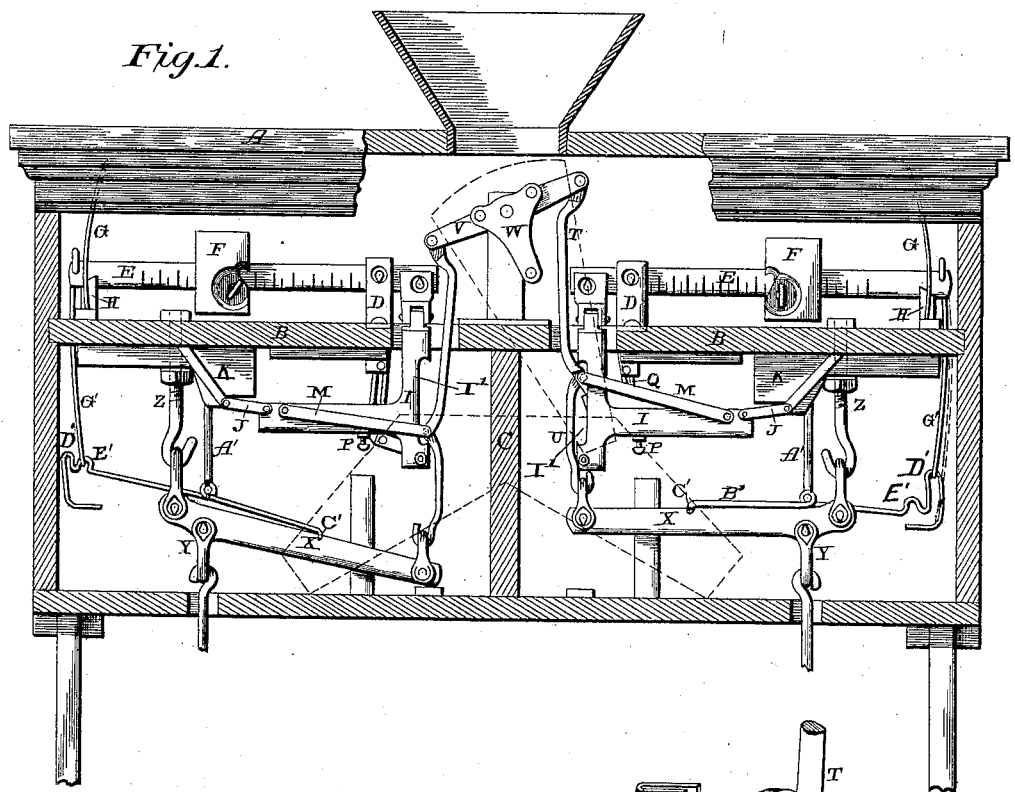
Figure 2:
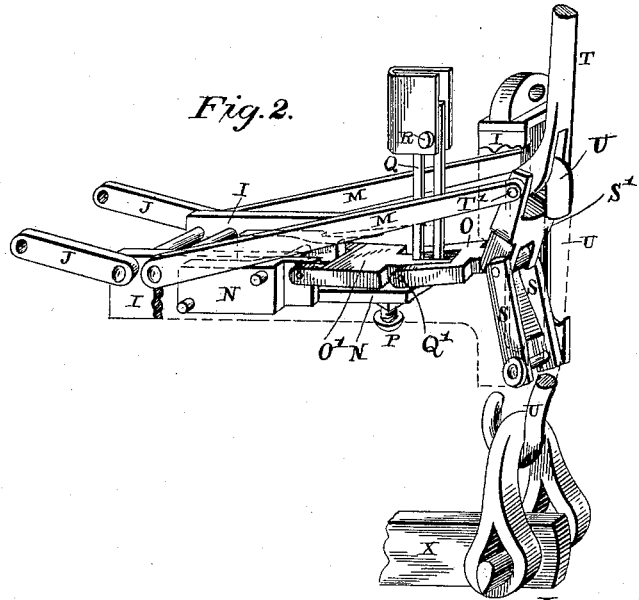

Figure 1 is a side elevation of a scale which embodies my invention. Fig. 2 is a perspective of the links and the supporting-frame of one of the beams alone, part of the frame being broken away.

A represents a suitable inclosing case in which the operating mechanism is placed, and which is provided with the horizontal partition B, which extends from one end to the other, and the vertical partition C. Through this frame are made suitable openings, through which the operating parts extend. Mounted upon the partition B are the supports D for the graduated scale-beams E, upon which the poises F are placed. These poises are movable back and forth upon the beams E in the usual manner and are provided with clamping-screws for the purpose of holding them in any desired position and preventing them from becoming accidentally displaced while the machine is in operation. The distances that the free ends of the beams shall rise are regulated by the links connected thereto, and their downward movements are regulated by the stops H, which are also secured to the partitions B. The wire loops G which extend up over the ends of the beams serve to keep them from getting out of place. Connected loosely to the inner short ends of the beams by intermediate loops or links are the vertically-moving frames I, which are supported at their inner ends from the beams E and at their outer ends by the links J, loosely pivoted at their outer ends to any suitable part K of the frame-work, so as to rise and fall. The frames I consist of a horizontal portion and the vertical part, which forms the inner end and stands at right angles to the horizontal portion, as shown, and this frame is cut away at its inner edge, so as to allow the arms to freely rise and fall. These frames I, being supported at one end by the links J, loosely connected to the beams E at their inner ends, rise and fall with the beams for the purpose of communicating motion to the other operating parts. Secured inside of each of the frames I is a support N, to which the link O' is pivotally connected and through the end of which passes a set-screw P, which regulates the distance the links O O' shall drop. It is immaterial whether the support N is cast as a part of the frame I or made separate therefrom. As here shown they are made separate and secured rigidly in position.

O O' are links, which are connected at their inner ends by the pivotal pin Q'. The outer end of the link O' is pivoted to the support N and the outer end of the link O to the connected ends of the links S S'. The lower end of the link S is pivoted to the frame I, and the upper end of the link S' is loosely connected to the arms M and the rod T by means of the pivotal bolt T'. The upper end of the rod U is also connected to this pivotal bolt.

Secured to the pivot Q' and extending upward therefrom is the vertically-slotted link Q, the vertical movement of which is limited by the stop R, which extends through the said slotted link and which is supported by a depending portion R', secured to the under side of the frame B. When the frame I sinks downward a certain distance, the link Q comes in contact with the stop R, which prevents it from having any further downward movement, and as the frame I continues to descend the inner connected ends of the links O O' are thus drawn upward above a horizontal line, when immediately the weight supported on the links S S' through the medium of the rod U forces the said links inward at their point of connection, causing the links O O' to fold upward and the link Q to rise. The links O O' prevent the links S S' from ever assuming a vertical position, and hence the weight supported on the last-named links exerts a pressure upon the links O O' all the time. The upper links S are pivoted to the inner ends of the arms M, which arms are pivoted at their outer ends to the horizontal portion of the frame I. To the bolt which connects the links S and the arms M are also connected the rods T U, the former being connected at their upper ends to the walking-beam V, which operates the shifting grain-spout. The lower ends of the rods M are connected to the ends of the levers X, which support the grain being weighed. The upper link S' has a vertical movement along with the rods T U, while the lower link S is pivoted at its lower end to the frame I. The rods T U are slightly bent inward at their pivoted meeting ends, as shown, so that in their vertical movement the said ends travel in the cut-away portion I' of the frame I, which limits the movement of the said rods.

The operation is as follows: When the grain is being filled into a bag or other receptacle, the weighing mechanism occupies the position shown in the right-hand side of Fig. 1. The grain being weighed is supported on the lever X by the loop Y. The lever X in this position is rigidly connected with the short end of lever E by the rod U, links S S', and the frame I, the said links being prevented from pushing inward at their point of connection by the links O O', which then occupy a horizontal position. As the grain flows into the receptacle its weight grows heavier on the lever X, and thus gradually draws it down, and with it the short end of the beam E, through the medium of the rod U, the rigidly-held links S S', and the frame I. The free end of the frame is thus lowered, and with it the links O O'. The link Q, being connected to the links O O' at their point of connection, descends with them; but the movement of this link is limited by the bolt or stop R, which passes through its opening. The said link having reached the limit of its movement and the frame I continuing to descend, the tendency is to draw up the connected ends of the links O O', allowing the links S S' to push inward, and thus breaking the rigid connection existing between the lever X and beam E. When this connection is broken, the weight which was before supported by the links S S' is transferred to the rod T, which, being depressed by the said weight, draws the walking-beam with it, thereby shifting the grain-spout to the other side of the weigher. The opposite end of the beam V being raised, the rod T is drawn upward and the links S S' and O O' straightened into their respective positions for another weighing operation.

It will be understood that the resistance of the beam E to the weight of the grain is regulated by the poise F, mounted thereon, and that the weight of grain passed into the receptacle is thus regulated at will.

In order to prevent the scale-beams from having any movement, and thus to lock the parts in position while the scale is being transported, there are pivoted upon the hangers A' the wire rods B', which have their inner ends bent at right angles, as shown at C', so as to catch over the upper edges of the scale-beams, while their outer ends are bent so as to form the long and short loops D' E'. Catching in these loops are the rods G', which pass through openings in the partition B and which have their upper ends bent at right angles, so as to catch over the outer ends of the scale-beams E. As one of the beams X has its inner end raised while the other one is depressed, the two loops D' E' are necessary. The lower end of the supporting-rod then catches in the longer loop for the beam that is raised, while the other supporting-rod catches in the shorter loop for the beam that has its end depressed. By this construction the looped rods, which are more or less elastic, are made to bear down upon the upper edges of the beams and prevent their having any movement. When the spout is fastened to the walking-beam and ready for use, it is thrown either to one side or the other, and the pull it exerts is thrown upon that beam which is receiving the weight of the grain or other material. The flow of grain, whether great or small, through this spout is exerted in the same place; but it is much greater than it would be if thrown upon the lower beam. The effect of this action is to counteract the tendency of a running stream to overbalance the weight.

Having thus described my invention, I claim—

1. In a scale, the beams, the poises adjustable upon the beams, the vertically-movable frames suspended at one end from the beams, links pivoted in the frame, the connecting-rods, the walking-beam, the tilting spout, and the lower beams from which the receptacles to receive the article being weighed are suspended, combined and arranged substantially as shown.

2. In a scale, the beams E X, connecting-rods, and a walking-beam for connecting the two parts of the scale together, combined with vertically-moving frames suspended from the beams E at one end and by links J at its other end, the links pivoted in the frame, and the slotted link connected to the lower links, substantially as described.

3. In a scale, the beams E X, a vertically-moving frame which is connected at one end of the beams E, the two sets of links O O' S S', pivoted in the frame, the slotted link Q, connected to the links O O', the arms M, connected to the links S', the connecting-rods U T, the walking-beam V, and the spout connected thereto, the parts being combined as set forth.

4. In a scale, the two beams E X, vertically-moving frames connected to the ends of the beams E, two sets of links arranged at right angles to each other in the frame, a slotted link, a pin or stop which passes through the slotted link to limit the downward movement of the horizontal links, the connecting-rods, the walking-beam, and the pivoted spout, the parts being combined substantially as specified.

5. In a scale, the beams E X, the frames suspended from the beams E, the two pairs of links pivoted in the frames, casting N, placed in the frame and provided with a set-screw P, the connecting-rods, the walking-beam, and the pivoted spout, the parts being combined substantially as shown.

In testimony whereof I affix my signature in presence of two witnesses.

FRANCIS M. GLADISH.

Witnesses:
PETER TORP,
J. S. UPTON.